United States Patent
Yamamoto et al.

(10) Patent No.: US 9,698,411 B2
(45) Date of Patent: Jul. 4, 2017

(54) ELECTRODE FOR BATTERY AND PRODUCTION METHOD THEREOF, NONAQUEOUS ELECTROLYTE BATTERY, BATTERY PACK, AND ACTIVE MATERIAL

(71) Applicant: KABUSHIKI KAISHA TOSHIBA, Minato-ku (JP)

(72) Inventors: Dai Yamamoto, Yokohama (JP); Takuya Iwasaki, Uenohara (JP); Yasuhiro Harada, Yokohama (JP); Hiroki Inagaki, Kawasaki (JP); Hideki Satake, Saku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 274 days.

(21) Appl. No.: 13/969,146

(22) Filed: Aug. 16, 2013

(65) Prior Publication Data
US 2013/0337315 A1 Dec. 19, 2013

Related U.S. Application Data

(63) Continuation of application No. PCT/JP2012/053072, filed on Feb. 10, 2012.

(30) Foreign Application Priority Data

Feb. 17, 2011 (JP) .................................. 2011-032088

(51) Int. Cl.
H01M 4/04 (2006.01)
H01M 4/131 (2010.01)
(Continued)

(52) U.S. Cl.
CPC ......... *H01M 4/131* (2013.01); *H01M 4/0404* (2013.01); *H01M 4/1391* (2013.01);
(Continued)

(58) Field of Classification Search
CPC . H01M 4/0404; H01M 4/1321; H01M 4/1391
(Continued)

(56) References Cited

U.S. PATENT DOCUMENTS

2004/0029003 A1 2/2004 Nobuta et al.
2007/0082267 A1 4/2007 Goodenough et al.
(Continued)

FOREIGN PATENT DOCUMENTS

CN 1290047 A 4/2001
CN 101847709 A 9/2010
(Continued)

OTHER PUBLICATIONS

Office Action and Search Report issued on Nov. 21, 2014 in the corresponding Chinese Patent Application No. 201280003649.8 (with English Translation).
(Continued)

*Primary Examiner* — Helen O Conley
*Assistant Examiner* — Victoria Lynch
(74) *Attorney, Agent, or Firm* — Oblon, McClelland, Maier & Neustadt, L.L.P.

(57) ABSTRACT

According to one embodiment, there is provided an electrode for battery which includes a current collector and an active material layer provided on the current collector. The active material layer contains particles of a lithium titanate compound having a spinel structure and a basic polymer. Here, the basic polymer is coating at least a part of the surface of the particles of the lithium titanate compound.

10 Claims, 6 Drawing Sheets

(51) Int. Cl.
   *H01M 4/1391* (2010.01)
   *H01M 4/36* (2006.01)
   *H01M 4/485* (2010.01)
   *H01M 4/62* (2006.01)

(52) U.S. Cl.
   CPC .......... *H01M 4/366* (2013.01); *H01M 4/485* (2013.01); *H01M 4/622* (2013.01); *Y02P 70/54* (2015.11)

(58) Field of Classification Search
   USPC ................ 427/126.1; 429/163, 212
   See application file for complete search history.

(56) References Cited

U.S. PATENT DOCUMENTS

| | | | |
|---|---|---|---|
| 2010/0216022 A1* | 8/2010 | Sano | H01M 4/134 429/212 |
| 2010/0248026 A1 | 9/2010 | Hinoki et al. | |
| 2012/0034521 A1* | 2/2012 | Matsuyama | H01M 4/661 429/211 |
| 2012/0058395 A1 | 3/2012 | Harada et al. | |
| 2013/0344384 A1 | 12/2013 | Hinoki et al. | |

FOREIGN PATENT DOCUMENTS

| | | |
|---|---|---|
| EP | 1 087 452 A2 | 3/2001 |
| JP | 57-9062 A | 1/1982 |
| JP | 4-342966 A | 11/1992 |
| JP | 2001-223031 A | 8/2001 |
| JP | 2002-50359 A | 2/2002 |
| JP | 2002-324551 A | 11/2002 |
| JP | 2004-127920 A | 4/2004 |
| JP | 2005-510017 A | 4/2005 |
| JP | 2005-268206 A | 9/2005 |
| JP | 2005-317389 A | 11/2005 |
| JP | 2005-317512 A | 11/2005 |
| JP | 2007-165061 A | 6/2007 |
| JP | 2008-060076 A | 3/2008 |
| JP | 2008-091326 A | 4/2008 |
| JP | 2008-91327 A | 4/2008 |
| JP | 2009-114020 A | 5/2009 |
| JP | 2010-61931 A | 3/2010 |
| JP | 2010-192403 A | 9/2010 |
| JP | 2010-225498 A | 10/2010 |
| JP | 2010-267462 A | 11/2010 |
| JP | 2012-9284 A | 1/2012 |
| JP | 2012-59467 A | 3/2012 |
| KR | 10-2010-0061349 A | 6/2010 |
| WO | WO 2006/130766 A2 | 12/2006 |

OTHER PUBLICATIONS

Japanese Office Action issued Apr. 15, 2014 in Patent Application No. 2011-032088 with English Translation.

International Search Report mailed Apr. 24, 2012, in PCT/JP2012/053072 filed Feb. 10, 2012.

K. Zaghib, et al., "Electrochemical study of $Li_4Ti_5O_{12}$ as negative electrode for Li-ion polymer rechargeable batteries", Journal of Power Sources 81-82, (Elsevier), 1999, pp. 300-305.

Extended European Search Report issued Sep. 24, 2014 in Patent Application No. 12746706.6.

* cited by examiner

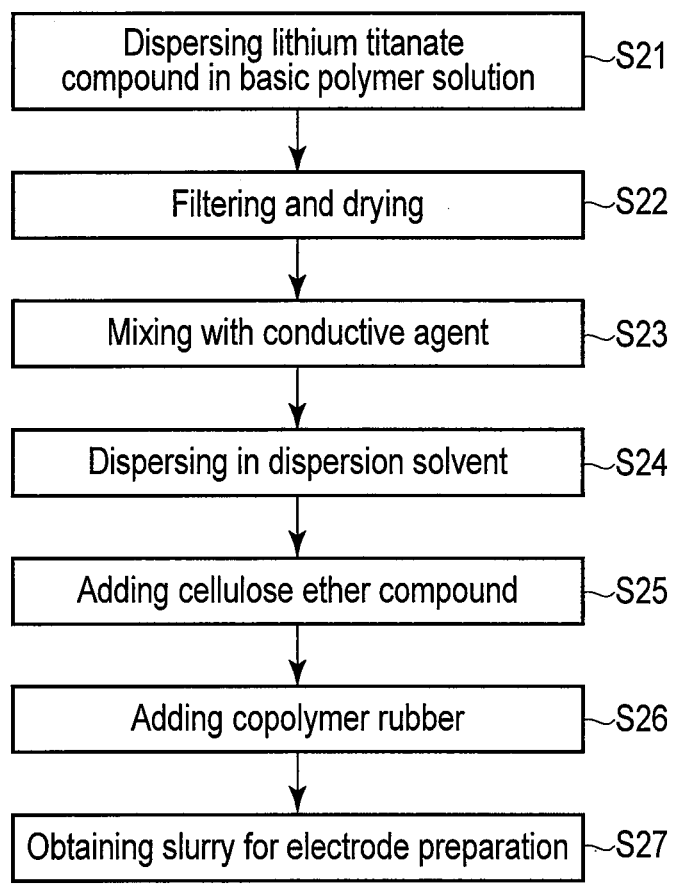
F I G. 1

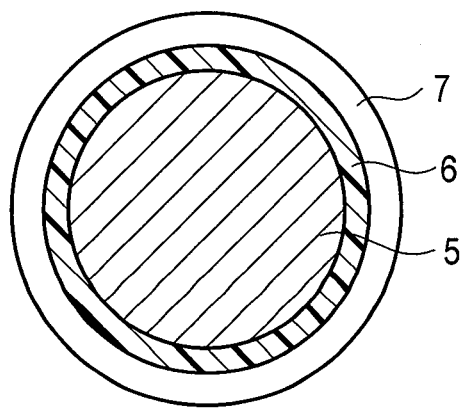
F I G. 2
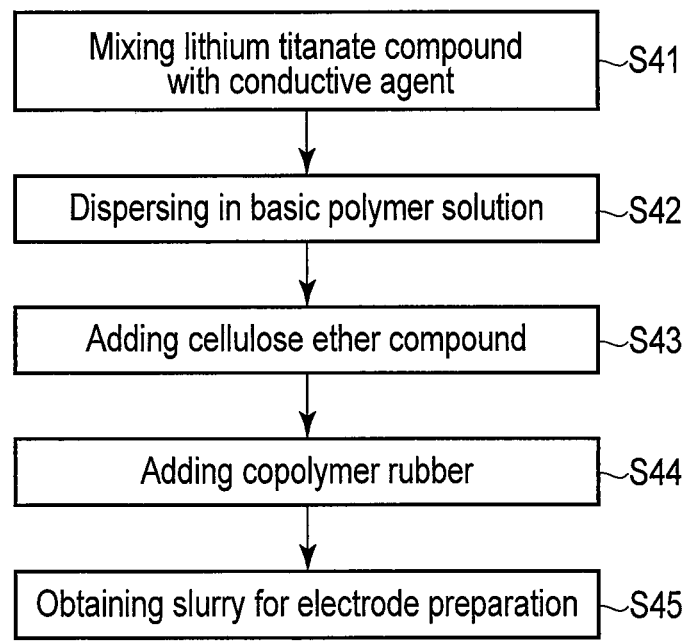
F I G. 3

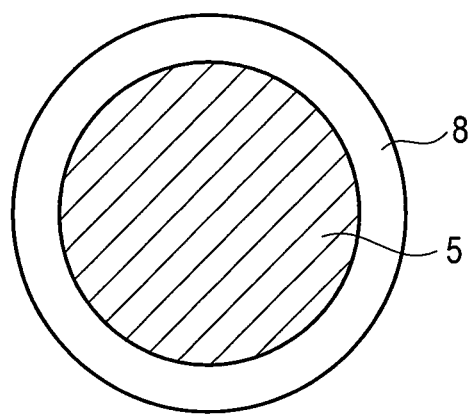
F I G. 4
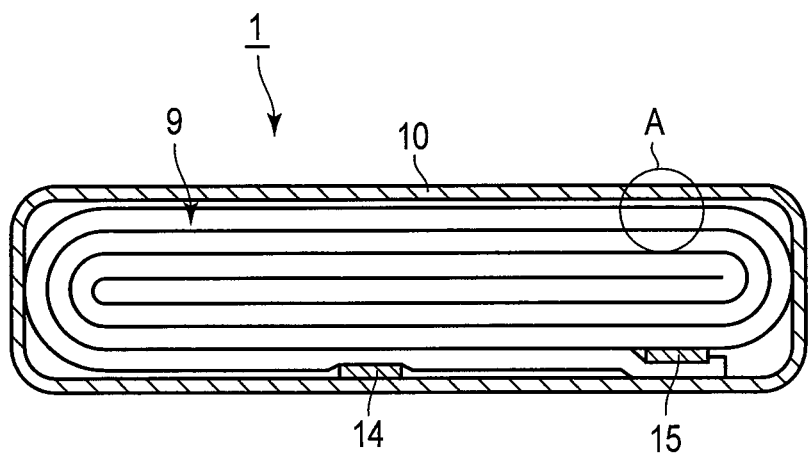
F I G. 5

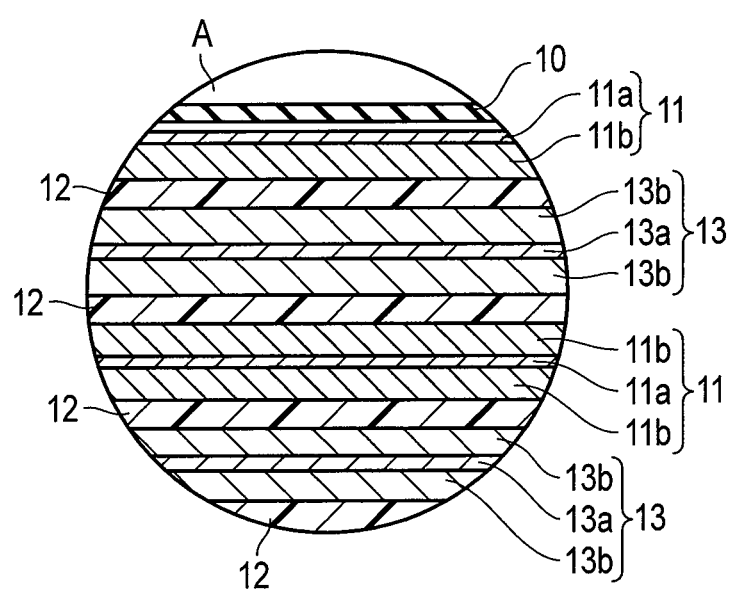
F I G. 6

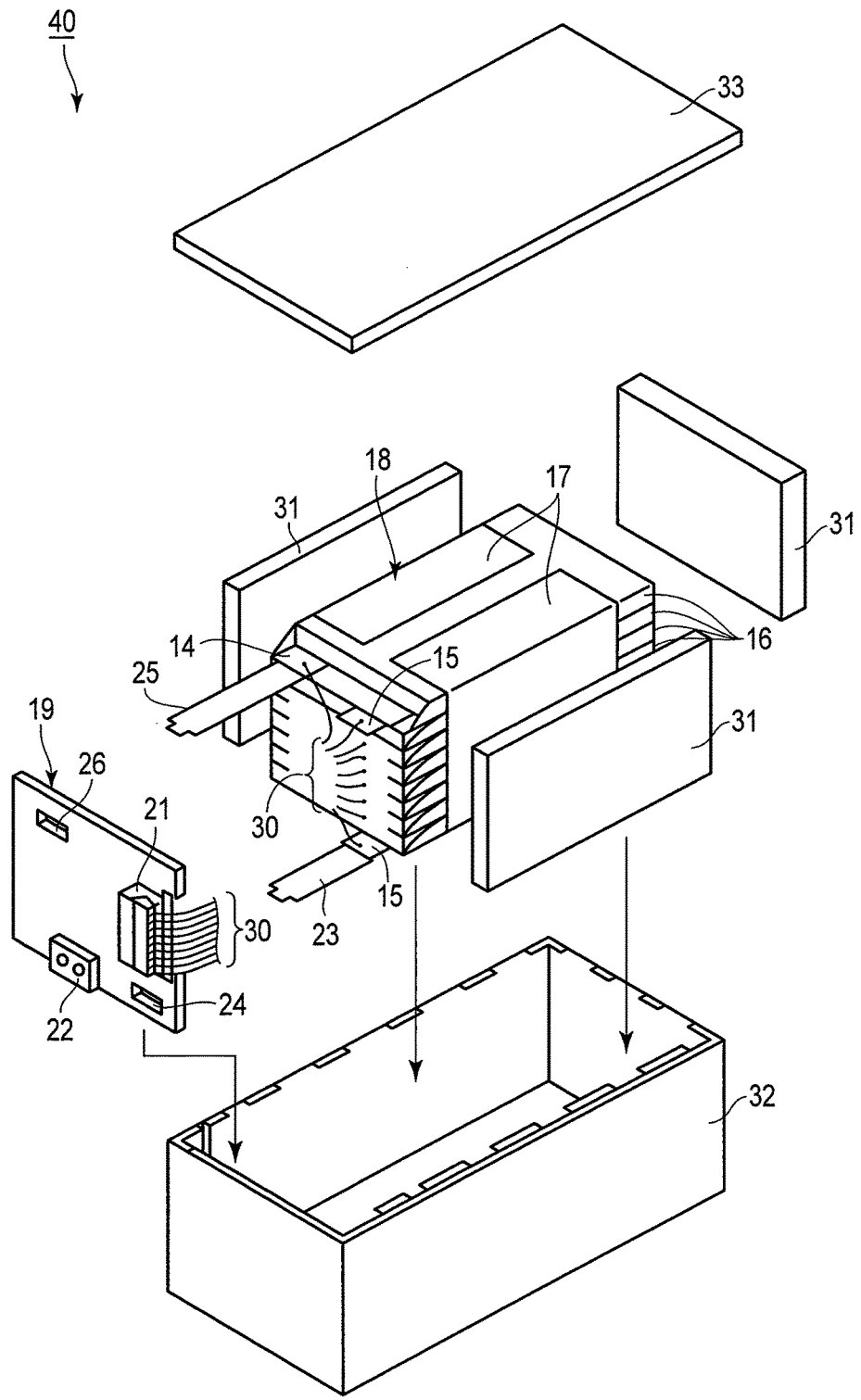
F I G. 7

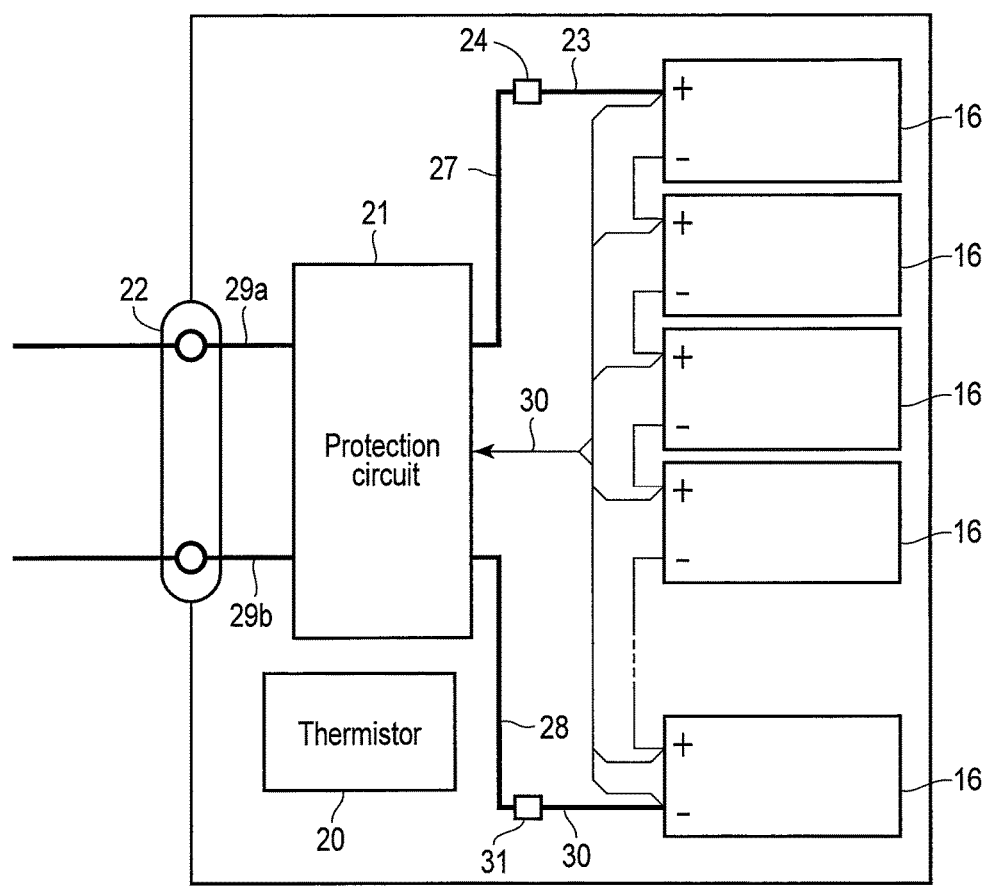
F I G. 8

ELECTRODE FOR BATTERY AND PRODUCTION METHOD THEREOF, NONAQUEOUS ELECTROLYTE BATTERY, BATTERY PACK, AND ACTIVE MATERIAL

CROSS REFERENCE TO RELATED APPLICATIONS

This application is a Continuation Application of PCT Application No. PCT/JP2012/053072, filed Feb. 10, 2012 and based upon and claiming the benefit of priority from Japanese Patent Application No. 2011-032088, filed Feb. 17, 2011, the entire contents of all of which are incorporated herein by reference.

FIELD

Embodiments described herein relate generally to an electrode for battery and the production method thereof, a nonaqueous electrolyte battery, a battery pack, and an active material.

BACKGROUND

A nonaqueous electrolyte battery using lithium titanium composite oxide as an active material has an advantage in that fast charge and discharge can be performed stably. In addition, such battery has longer life compared to the battery using a carbon-based material such as graphite as an active material. However, those battery using lithium titanium composite oxide as an active material generate more gas at the time of charging and discharging or during storage, as compared to the battery using a carbon-based material as an active material. In particular, a large amount of gas is generated during the initial use. In addition, a large amount of gas is also generated when the battery are stored at high temperatures. If a large amount of gas is generated, battery expand is generated. As a result, the internal resistance increases, thereby deteriorating the cycle performance.

CITATION LIST

Patent Literature

Patent Literature 1: JP-A No. 2005-317512
Patent Literature 2: JP-A No. 2008-91326
Patent Literature 3: JP-A No. 2010-192403

Non Patent Literature

Non Patent Literature 1: K. Zaghib, M. Simoneau, M. Armand, and M. Gautheir, Journal of Power Sources, 81-82, pp. 300, (1999).

BRIEF DESCRIPTION OF THE DRAWINGS

FIG. 1 is a flow diagram of a method for producing an electrode according to a first method of a second embodiment.

FIG. 2 is a schematic diagram illustrating the particles contained in the electrode produced in the flow of FIG. 1.

FIG. 3 is a flow diagram of a method for producing an electrode according to a second method of a second embodiment.

FIG. 4 is a schematic diagram illustrating the particles contained in the electrode produced in the flow of FIG. 3.

FIG. 5 is a cross sectional view of a flat type nonaqueous electrolyte battery according to a third embodiment.

FIG. 6 is an enlarged cross sectional view of the part A in FIG. 5.

FIG. 7 is an exploded perspective view of a battery pack according to a fourth embodiment.

FIG. 8 is a block diagram illustrating the electrical circuit of the battery pack shown in FIG. 7.

DETAILED DESCRIPTION

A nonaqueous electrolyte battery having excellent cycle performance which does not expand even when being stored at high temperatures, and an electrode for battery which is used in this battery and the production method thereof, as well as a battery pack and an active material used therein will be provided.

In general, according to one embodiment, there is provided an electrode for battery which includes a current collector and an active material layer provided on the current collector. The active material layer contains particles of a lithium titanate compound having a spinel structure and a basic polymer. Here, the basic polymer is coating at least a part of the surface of the particles of the lithium titanate compound.

With respect to the lithium titanate compound having a spinel structure (hereafter, referred to as "LTO"), the size and structure of the crystal lattice hardly change when charging or discharging the battery. Therefore, the battery using the LTO exhibit an extremely high cycle stability. In addition, when the battery are shorted due to some accident, the shorted part is rapidly discharged and the resistance increases. As a result, it is possible to prevent a large amount of current to flow. Therefore, it is possible to prevent the abnormal heating of battery. From these results, the battery using the LTO as an active material exhibit excellent cycle stability and safety.

However, with the battery using the LTO as an active material, a large amount of gas is generated, especially during the initial use. It is thought that this is caused because LTO has solid acid sites such as a hydroxyl group (OH—) and a hydroxyl radical (OH.). In the LTO, OHs may be presented in an isolated state or forming a weak hydrogen bond, on the site corresponding to the solid acid sites. It is thought that these OHs become hydrogen sources to generate hydrogen gas. In addition, it is thought that a trace amount of water present in the battery is reduced by the solid acid sites to generate hydrogen gas. LTO adsorbs more water, as compared to the graphite-based materials. For this reason, it is thought that the battery using the LTO generate a large amount of hydrogen gas.

Typically, electrode materials are dried at high temperatures and produced in a dry room environment. However, it is difficult to completely remove the adsorbed water. Water may be introduced in the process of producing raw materials or in the process of assembling the battery. Therefore, it is difficult to chemically remove water completely from the viewpoints of the nature of raw materials and cost. On the other hand, in those cases where the OHs or adsorbed water on the LTO surface is removed by a dehydration reaction, it is necessary to heat at 300° C. or higher. From the viewpoint of heat resistance of the other components of the battery, it is undesirable to dry by heating at 300° C. or higher after the battery production. For this reason, it is difficult to completely remove the adsorbed water and to thereby completely suppress the generation of hydrogen gas.

Therefore, the battery using the LTO generate a large amount of hydrogen gas. Generation of hydrogen gas is especially remarkable in the case of high-temperature storage. When a large amount of hydrogen gas is generated, the battery expands and the cycle performance deteriorate.

Accordingly, the inventors of the present invention incorporated a basic polymer within an active material layer to neutralize at least a part of the solid acid sites in the LTO. In this manner, it is possible to suppress the adverse effects of the solid acid sites and to suppress the gas generation. Furthermore, it is possible to improve the cycle performance.

An electrode and the production method thereof, a non-aqueous electrolyte battery using the electrode, a battery pack and an active material according to the respective embodiments will be described below with reference to the drawings. It should be noted that throughout the embodiments, the common configurations will be given the same reference numerals and symbols, and repeated descriptions thereof will be omitted.

First Embodiment

An electrode for battery according to a first embodiment includes a current collector, and an active material layer provided on the current collector. The active material layer contains LTO particles and a basic polymer. The basic polymer coats at least a part of the surface of the LTO particles. The LTO may be one represented by the formula: $Li_xTi_yO_{12}$ ($3 \leq x \leq 8$, $4 \leq y \leq 6$).

In the active material layer, at least a part of the surface of the LTO particles is coated with the basic polymer. As a result, the solid acid sites on the surface of the LTO are neutralized, thereby weakening the influence of isolated OHs and hydrogen bonds. As a result, it becomes possible to remove the moisture by drying in a temperature range that does not adversely affect the battery. For this reason, the gas generation is suppressed. In addition, film formation is also suppressed, and an increase in the resistance is also suppressed due to this. Therefore, it is possible to improve the storage properties of the battery. Moreover, due to inactivation of the solid acid sites in the LTO, the irreversible capacity of the battery is reduced, and the charge-discharge efficiency is also improved.

The LTO particle may be a primary particle or may even be a secondary particle formed by the aggregation of primary particles. The form of secondary particles is preferred, since the specific surface area is small. In the case of employing secondary particles, the stability of the slurry for producing electrodes is high. In addition, since the contact area with an electrolyte is small, it is possible to suppress the reaction with the electrolyte.

The state where at least a part of the surface of the LTO particles is coated with the basic polymer includes, for example, a state where the basic polymer is bound to and/or attached to at least a part of the surface of either or both of the primary particles and secondary particles of the LTO. Alternatively, a state where the pores of the LTO particles are impregnated with the basic polymer is included. The thickness of the basic polymer attached to the LTO is preferably such that the electrical conductivity is not reduced, and the insertion and release of Li is also not inhibited.

The presence of the basic polymer in the active material layer can be confirmed by measuring the electrode surface by an IR measurement method or a Raman measurement method. In addition, the coating of the LTO by the basic polymer can be confirmed using a transmission electron microscope (TEM) or a scanning electron microscope (SEM).

It should be noted that not all the solid acid sites in the LTO need to be neutralized, as long as at least a part thereof is neutralized.

The basic polymer may be either conductive or non-conductive. It is preferable that the basic polymer is incorporated in an amount from 0.01% by mass to 10% by mass relative to the total mass of the LTO contained in the active material layer. Here, the total mass of the LTO refers to a value derived by excluding the mass of the basic polymer attached to the LTO particles. By containing 0.01% by mass or more of the basic polymer, it is possible to achieve the effect of neutralizing the solid acid sites. On the other hand, by adjusting the content of the basic polymer to 10% by mass or less, it is possible to prevent the reduction of electrical conductivity of the electrode body.

The content of the basic polymer in the active material layer can be measured by employing evolved gas analysis (EGA) and pyrolysis gas chromatography/mass spectrometry (GC/MS) using a double-shot method. Alternatively, the measurement can be made by analyses using various devices such as an organic element analyzer.

The basic polymer is preferably a polymer having a molecular weight from 100 to 100,000, although is not limited thereto. The basic polymers having a molecular weight of equal to or greater than 100 exhibit strength and binding properties that can withstand changes in the lattice size of the active material during charge and discharge. The basic polymers having a molecular weight of equal to or less than 100,000 do not interfere with the lithium ion conductivity and electronic conductivity of the active material. The basic polymers having a molecular weight from 500 to 5,000 are more preferred.

Amine compounds can be used as the basic polymer. The amine compound is preferably a nitrogen-containing aromatic heterocyclic compound, although is not limited thereto. By using a nitrogen-containing aromatic heterocyclic compound, an excellent coating effect can be achieved. As the nitrogen-containing aromatic heterocyclic compound, a single kind of compound may be used alone, or two or more kinds of compounds may be used in combination.

Preferred examples of the nitrogen-containing aromatic heterocyclic compound include quinoline, isoquinoline, acridine, phenanthridine, phenanthroline, acetyl pyridine, phenyl pyridine, 2,6-di-t-butyl-4-methylpyridine, pyridazine, pyrimidine, pyrazine, cinnoline, phthalazine, quinazoline quinoxaline, methyl pyridazine, acetyl pyridazine, phenyl pyridazine, methylpyrimidine, acetyl pyrimidine, phenyl pyrimidine, methylpyrazine, acetyl pyrazine, phenyl pyridine, triazine, benzotriazine, methyl triazine, acetyl triazine, phenyl triazine, tetrazine, methyl tetrazine, acetyl tetrazine, phenyl tetrazine, pyrrole, methylpyrrole, vinyl pyrrole, methylpyrrole, acetyl pyrrole, phenyl pyrrole, indole, methyl indole, carbazole, methyl carbazole, oxazole, thiazole, isoxazole, benzoxazole, benzisoxazole, anthranil, benzothiazole, benzisothiazole, imidazole, pyrazole, oxadiazole, thiadiazole, oxadiazole, N-methyl imidazole, N-phenyl imidazole, N-vinyl imidazole, N-acetyl imidazole, benzimidazole, isoindazole, indazole and benzofurazan.

Imidazole salts such as polybenzimidazole are preferred because the polymer strength is strong. In addition, the pyridine-based compounds such as polyvinyl pyridine are preferred because the effect of suppressing the solid acidity is high.

It is preferable that the active material layer further contains at least one of the cellulose ether compounds and copolymer rubbers. The cellulose ether compounds and copolymer rubbers may be used as a binder. The cellulose ether compounds may also be used as a thickening agent for the binder.

The cellulose ether compounds and copolymer rubbers have a property to coat particles. Accordingly, if at least one of the cellulose ether compounds and copolymer rubbers is present in the active material together with the LTO and the basic polymer, a higher level of coating effects can be achieved due to the synergistic effect with the basic polymer. As a result, it is possible to further suppress the adsorption of moisture to the LTO by further reducing the solid acidity of the LTO.

The cellulose ether compounds are vulnerable to acidity. For this reason, they are easily broken down by a solid acid. Therefore, it is difficult to use them as a material for coating the LTO. However, according to the present embodiment, the solid acidity of the LTO has been neutralized by the basic polymer. Therefore, it is possible to use a cellulose ether compound as the material for coating the LTO.

Although the cellulose ether compound and copolymer rubber may be used individually, it is more preferable to use both of them. Copolymer rubbers exhibit a low viscosity, and are present in a solvent in a dispersed state. However, by adding a cellulose ether compound together with the copolymer rubber, it is possible to increase the viscosity. This makes it possible to enhance the effect of coating the LTO. As a result, it is possible to further enhance the effect of suppressing the solid acidity.

Further, the cellulose ether compounds and copolymer rubbers also act as a binder. Therefore, it is possible to improve the binding properties of the active material layer. As described above, the cellulose ether compounds and copolymer rubbers have a property to coat particles. For this reason, the particles of active material and conductive agent in the active material layer are coated. Therefore, the particles are bound to each other through surface contact in the active material layer. In this manner, it is possible to improve the viscoelasticity of the active material layer. As a result, it is possible to improve the resistance to volume change of the active material layer. Therefore, it is possible to suppress the twisting of the electrode. Further, it is possible to suppress detachment of the active material layer from the current collector foil.

As described above, due to inclusion of at least one material selected from the cellulose ether compounds and copolymer rubbers in the active material layer, the reaction between the active material and an electrolyte can be suppressed. In addition, the detachment of the active material layer can be suppressed. Therefore, it is possible to further improve the cycle performance of the battery.

Preferred examples of cellulose ether compounds include carboxymethyl cellulose, carboxyethyl cellulose and hydroxyethyl cellulose, and alkali metal salts of these cellulose compounds, such as lithium salts, sodium salts and potassium salts, and ammonium salts of these cellulose compounds.

Preferred examples of copolymer rubbers include styrene-conjugated diene copolymers such as styrene-butadiene copolymer rubbers; nitrile-conjugated diene copolymer rubbers such as nitrile-butadiene copolymer rubbers; silicon rubbers such as polyorganosiloxane; polymers of alkyl acrylate esters; acrylic rubbers obtained by copolymerization of alkyl acrylate esters with ethylenically unsaturated carboxylic acid or other ethylenically unsaturated monomers; and fluorine-containing rubbers such as vinylidene fluoride copolymer rubbers.

In the present embodiment, the particle size or BET specific surface area of the LTO is not particularly limited. The same level of effects can be achieved, regardless of the particle size or specific surface area of the LTO.

It is preferable that the cellulose ether compound is incorporated in an amount from 0.5% by mass to 5% by mass, relative to the total mass of the LTO contained in the active material layer. Here, the total mass of the LTO refers to a value derived by excluding the mass of the attached basic polymer.

By containing at least 0.5% by mass of the cellulose ether compound, the particle surface can be coated while the viscosity of a slurry is stably increased. On the other hand, by containing the cellulose ether compound at a content of 5% by mass or less, it is possible to prevent a reduction in the electronic conductivity and ionic conductivity due to excessive coating.

It is preferable that the copolymer rubber is incorporated in an amount from 0.5% by mass to 10% by mass, relative to the total mass of the LTO contained in the active material layer. Here, the total mass of the LTO refers to a value derived by excluding the mass of the attached basic polymer. By containing at least 0.5% by mass of the copolymer rubber in the active material layer, it is possible to secure the binding properties with the current collector and to achieve excellent cycle performance.

On the other hand, by containing the copolymer rubber in the active material layer at a content of 10% by mass or less, it is possible to secure the fluidity of the electrode slurry while maintaining the electronic conductivity and ionic conductivity. Therefore, the slurry can be easily applied onto the current collector.

The presence of the cellulose ether compound in the active material layer can be confirmed by observing the electrode surface using a scanning electron microscope or a transmission electron microscope.

The content of the cellulose ether compound in the active material layer can be measured by employing evolved gas analysis (EGA) and pyrolysis GC/MS using a double-shot method. Alternatively, the measurement can be made by analyses using various devices such as an organic element analyzer.

The presence of the copolymer rubber in the active material layer can be confirmed by observing the electrode surface using a scanning electron microscope or a transmission electron microscope.

The content of the copolymer rubber in the active material layer can be measured by employing evolved gas analysis (EGA) and pyrolysis GC/MS using a double-shot method. Alternatively, the measurement can be made by analyses using various devices such as an organic element analyzer.

According to the above embodiment, it is possible to provide an electrode in order to achieve a battery with improved storage properties and cycle performance.

Second Embodiment

Next, a method of producing the electrode according to the first embodiment will be described. This production method includes the formation of an active material layer by applying a slurry on the surface of the current collector, followed by drying.

<First Method>

As a first method, a method will be described in which LTO particles are treated in advance with a basic polymer, and an electrode is then produced using the LTO particles following the treatment.

The first production method includes: dispersing the LTO particles in a solution containing the basic polymer to prepare a dispersion liquid; separating the LTO particles to which the basic polymer is attached from the dispersion liquid and drying to obtain the LTO particles in which at least a part of the surface is coated with the basic polymer; and preparing a slurry containing the LTO particles in which at least a part of the surface is coated with the basic polymer.

FIG. 1 shows an example of the flow of the first method. In the example shown in FIG. 1, a powder of LTO is dispersed in a basic polymer solution to prepare a dispersion liquid (S21). At this time, in order to promote the impregnation of the basic polymer solution into the pores of the LTO particles, the dispersion liquid may be decompressed.

Subsequently, the dispersion liquid is filtered, and the LTO particles coated with the basic polymer is separated and then dried (S22). In this manner, the LTO particles in which at least a part of the surface has been coated with the basic polymer can be obtained. The drying process may be carried out by heating. The heating temperature varies depending on the type of the basic polymer, although it is preferably within the range of 60 to 400° C., and can be set to, for example, about 350° C.

Note that with respect to the LTO coated with the basic polymer, the basic polymer is preferably incorporated in an amount from 0.01% by mass or more to 10% by mass or less, relative to the total mass of the LTO. In those cases where 0.01% by mass or more of the basic polymer is contained, it is possible to achieve the effect of neutralizing the solid acid sites. According to the first method, by coating the LTO particles with the basic polymer in advance, most of the basic polymers present in the active material layer can be made present on the surface of the LTO particles. For this reason, it is possible to adjust the content of the basic polymer to 10% by mass or less. The content of the basic polymer can be changed by adjusting the concentration of the basic polymer solution used for preparing the dispersion liquid. Alternatively, the content can also be changed by changing the conditions for the separation of LTO from the dispersion liquid, thereby adjusting the amount of the basic polymer solution to be adhered to the LTO.

Subsequently, the LTO particles coated with the basic polymer are mixed with a conductive agent (S23). This mixture is added in a dispersion solvent for slurry preparation to prepare a dispersion liquid (S24). A cellulose ether compound is added to this dispersion liquid and mixed (S25). Further, by adding and mixing the copolymer rubber (S26), a slurry for electrode preparation is obtained (S27).

The slurry obtained in this manner is applied onto one or both surfaces of the current collector made of a metal foil, and then dried, thereby forming an active material layer. Then, an electrode can be obtained by pressing the active material layer together with the current collector.

FIG. 2 shows a schematic cross sectional view of the LTO particles in the active material layer produced by the first method. As shown in FIG. 2, a secondary particle 5 of LTO is coated with a basic polymer layer 6, and the basic polymer layer 6 is further coated with a mixed layer 7 constituted of a binder such as a cellulose ether compound and a copolymer rubber, and a conductive agent.

It should be noted that although both a cellulose ether compound and a copolymer rubber are used in the example shown in FIG. 1, only either one of them may be used or both of them may not be used. In addition, other binders may be used instead of these.

<Second Method>

Next, as a second method, a method of producing electrodes by using the LTO and the basic polymer independently of each other will be described.

The second production method includes: dispersing the LTO particles in a solution containing the basic polymer to prepare a dispersion liquid; and preparing a slurry using this dispersion liquid.

FIG. 3 shows an example of the flow of the second method. In the example shown in FIG. 3, a powder of the LTO is mixed with a conductive agent (S41). Subsequently, this mixture is dispersed in a basic polymer solution to prepare a dispersion liquid (S42). At this time, in order to promote the impregnation of the basic polymer solution into the pores of the LTO, the dispersion liquid may be decompressed.

Then, a cellulose ether compound is added to this dispersion liquid and mixed (S43). Further, the copolymer rubber is added and mixed therewith (S44). In this manner, a slurry for electrode preparation is obtained (S45).

It should be noted that when additives such as conductive agents or binders are not used, the process of preparing the dispersion liquid can be omitted.

The slurry obtained in this manner is applied onto one or both surfaces of the current collector made of a metal foil, and then dried, thereby forming an active material layer. Then, an electrode can be obtained by pressing the active material layer together with the current collector. In the active material layer prepared in this manner, at least a part of the surface of the LTO particles is coated with the basic polymer.

FIG. 4 shows a schematic cross sectional view of the LTO particles in the active material layer produced by the second method. As shown in FIG. 4, a secondary particle 5 of LTO is coated with a mixed layer 8 constituted of a binder such as a cellulose ether compound and a copolymer rubber, a conductive agent and a basic polymer.

It should be noted that although both a cellulose ether compound and a copolymer rubber are used in the example shown in FIG. 3, only either one of them may be used or both of them may not be used. In addition, other binders may be used instead of these.

Further, in the second method, in order to achieve the effect of neutralizing the solid acid sites in the LTO, the content of the basic polymer is preferably at least 0.05% by mass, relative to the total mass of the LTO contained in the active material layer. Here, the total mass of the LTO refers to a value derived by excluding the mass of the attached basic polymer. The content of the basic polymer can be adjusted by changing the concentration of the basic polymer solution, the mixing ratio of the solution and the LTO, and the like.

In the active material layer produced by the production method as described above, the basic polymer is present in at least a part of the surface of the LTO, and at least a part of the solid acid sites in the LTO is neutralized. This makes it possible to obtain an electrode in which the adsorption of moisture to the LTO is suppressed.

Further, in the method of the present embodiment, it is preferable to use a cellulose ether compound and/or a copolymer rubber as a binder. Because the cellulose ether compound and the copolymer rubber disperse in water, water can be used instead of an organic solvent as a solvent of the slurry for the electrode preparation. Therefore, it is possible to reduce the cost and environmental load, and there is also an advantage in that facilities can be simplified.

According to the above embodiment, it is possible to provide a method of producing an electrode for producing a battery with improved storage properties and cycle performance.

Third Embodiment

In the third embodiment, there is provided a nonaqueous electrolyte battery that includes an electrode according to the first embodiment as a negative electrode, and further includes a positive electrode, a nonaqueous electrolyte, separators and a container.

FIG. 5 shows an example of a nonaqueous electrolyte secondary battery. FIG. 5 is a schematic cross sectional view of a flat type nonaqueous electrolyte secondary battery 1. FIG. 6 is an enlarged cross sectional view of the part A in FIG. 5. It should be noted that each drawing is a schematic view for promoting explanation and understanding of the embodiments, and although the shape, size, ratio, and the like therein may be different from those in the actual device, they can be appropriately designed and changed by taking the following description and the known technology into consideration.

The nonaqueous electrolyte battery 1 is provided with a wound electrode group 9. The wound electrode group 9 is accommodated in the container 10. Inside the container 10 is further filled with a nonaqueous electrolyte (not shown).

As shown in FIG. 6, the wound electrode group 9 is constituted of a negative electrode 11, a separator 12 and a positive electrode 13. The wound electrode group 9 is formed by spirally winding a laminate in which the negative electrode 11, the separator 12, the positive electrode 13 and the separator 12 are laminated in this order, and then press molding the resultant.

As shown in FIG. 5, in the vicinity of the outer peripheral edge of the wound electrode group 9, a negative electrode terminal 14 is connected to the negative electrode 11, and a positive electrode terminal 15 is connected to the positive electrode 13.

An external bag made of a laminate film is used as an container 3. The wound electrode group 9 and the nonaqueous electrolyte are sealed by heat sealing the opening of the external bag made of a laminate film, in a state where the negative electrode terminal 14 and the positive electrode terminal 15 are extended.

<Negative Electrode>

As shown in FIG. 6, the negative electrode 11 is provided with a negative electrode current collector 11a and a negative electrode active material layer 11b. The negative electrode active material layer 11b includes a negative electrode active material, and optionally includes a conductive agent and a binder. The negative electrode active material layer 11b is provided on one or both surfaces of the negative electrode current collector 11a.

As the negative electrode 11, the electrode according to the first embodiment is used. In such a negative electrode, the solid acid sites in the LTO are neutralized, and the number of isolated OHs or the like is reduced. Therefore, the nonaqueous electrolyte battery using such a negative electrode is capable of suppressing the gas generation, while exhibiting favorable cycle performance.

It is preferable that the negative electrode active material layer further contains at least one of a cellulose ether compound and a copolymer rubber. It is more preferable to contain both the cellulose ether compound and the copolymer rubber. By containing both of them, in addition to improving the effect of coating the particle surface, it is possible to improve the adhesion between the active material particles and between the current collector foil and the active material particles. Thus, it is possible to suppress the twisting of the electrode or the detachment of the electrode which is caused by the volume change of the LTO lattice during charge and discharge. Therefore, it is possible to improve the cycle performance.

As the negative electrode active material, other active materials can also be used in combination with the LTO. Examples of other active materials include nanotube/nanofiber type titanium dioxide $TiO_2$, lithium titanate $Li_2Ti_3O_7$ of a ramsdellite structure, and monoclinic titanium dioxide $TiO_2(B)$. These active materials can be suitably used because they have a specific gravity or the like which is close to that of the LTO, and are thus easy to mix and disperse.

The conductive agent enhances the current collecting performance of the active material, and suppresses the contact resistance with the current collector. Examples of the conductive agent include carbonaceous materials such as acetylene black, carbon black and graphite.

A binder is added in order to fill the gap between the dispersed negative electrode active materials and binds an active material and a conductive agent. Examples of the binder include polytetrafluoroethylene (PTFE) and polyvinylidene fluoride (PVdF). It is possible to achieve the effect of suppressing the solid acidity by the basic polymer even when these binders are used. However, if the negative electrode contains a cellulose ether compound or a copolymer rubber, since they function as a binder, there is no need to use other binders.

In the negative electrode active material layer, it is preferable that the contents of the active material, basic polymer, conductive agent and binder are 68 to 96 parts by mass, 0.01 to 5 parts by mass, 2 to 30 parts by mass, and 2 to 20 parts by mass, respectively.

If the content of the basic polymer is equal to or greater than 0.01 parts by mass, it is possible to achieve the effect of suppressing the solid acidity. If the content of the conductive agent is equal to or greater than 2 parts by mass, the current collecting performance of the negative electrode active material layer is satisfactory. In addition, if the content of the binder is equal to or greater than 2 parts by mass, the binding properties between the negative electrode active material layer and the current collector are satisfactory, and excellent cycle performance can be expected. On the other hand, in order to ensure the electronic conductivity and the ionic conductivity, the content of the basic polymer is preferably equal to or less than 5 parts by mass. In addition, in order to increase the capacity of the nonaqueous electrolyte battery, the content of the conductive agent is preferably 10 parts by mass or less, and the content of the binder is preferably 10 parts by mass or less.

For the negative electrode current collector 11a, a material that is electrochemically stable in the potential of absorbing and desorbing lithium serving as the negative electrode active material is used. The negative electrode current collector 11a is preferably made from copper, nickel, stainless steel or aluminum, or an aluminum alloy containing at least one element selected from Mg, Ti, Zn, Mn, Fe, Cu and Si. The thickness of the negative electrode current collector 11a is preferably from 5 to 20 µm. The negative electrode current collector 11a having such a thickness is capable of balancing the strength and weight reduction of the negative electrode.

The negative electrode terminal 14 is formed, for example, from a material that is electrochemically stable at the Li-insertion/release potential of the negative electrode active material and is also conductive. More specifically, it is formed from copper, nickel, stainless steel or aluminum, or an aluminum alloy containing at least one element of Mg, Ti, Zn, Mn, Fe, Cu and Si. It is preferable that the negative electrode terminal 14 be formed from a material similar to that of the negative electrode current collector 11a, in order to reduce the contact resistance with the negative electrode current collector 11a.

The negative electrode 11 can be prepared as described in the above-mentioned second embodiment. Namely, it is prepared by applying the slurry for electrodes onto a current collector and then drying the resultant to form a negative electrode active material layer, followed by pressing. Alternatively, the active material, the basic polymer, the conductive agent and the binder are made into a pellet, which may be used as the active material layer. The active material layer thus obtained is disposed on the current collector to construct the electrode.

<Positive Electrode>

As shown in FIG. 6, the positive electrode 13 is provided with a positive electrode current collector 13a and a positive electrode active material layer 13b. The positive electrode active material layer 13b includes a positive electrode active material, and optionally includes a conductive agent and a binder. The positive electrode active material layer 13b is provided on one or both surfaces of the positive electrode current collector 13a.

As the positive electrode active material, for example, oxides, sulfides, or polymers can be used. Examples of oxides and sulfides include manganese dioxide ($MnO_2$) that absorbs lithium, iron oxide, copper oxide, nickel oxide, lithium manganese composite oxides (such as $Li_xMn_2O_4$ or $Li_xMnO_2$), lithium nickel composite oxides (such as $Li_xNiO_2$), lithium cobalt composite oxides (such as $Li_xCo_yO_2$), lithium nickel cobalt composite oxides (such as $LiNi_{1-y}Co_yO_2$), lithium manganese cobalt composite oxides (such as $Li_xMn_yCo_{1-y}O_2$), lithium manganese nickel composite oxides having a spinel structure (such as $Li_xMn_{2-y}Ni_yO_4$), lithium phosphorus oxides having an olivine structure (such as $Li_xFePO_4$, $Li_xFe_{1-y}Mn_yPO_4$ and $Li_xCoPO_4$), iron sulfate [$Fe_2(SO_4)_3$], vanadium oxides (such as $V_2O_5$), and lithium nickel cobalt manganese composite oxides. Here, $0<x\leq1$, and $0<y\leq1$. As an active material, these compounds may be used alone, or a plurality of compounds may be used in combination.

Examples of polymers include conductive polymer materials such as polyaniline and polypyrrole, or disulfide-based polymer materials.

In addition, sulfur (S) or carbon fluoride can also be used as a positive electrode active material.

Examples of more preferred positive electrode active materials include lithium manganese composite oxides having a high positive electrode voltage ($Li_xMn_2O_4$), lithium nickel composite oxides ($Li_xNiO_2$), lithium cobalt composite oxides ($Li_xCoO_2$), lithium nickel cobalt composite oxides ($LiNi_{1-y}Co_yO_2$), lithium manganese nickel composite oxides having a spinel structure ($Li_xMn_{2-y}Ni_yO_4$), lithium manganese cobalt composite oxides ($Li_xMn_yCo_{1-y}O_2$), lithium iron phosphate ($Li_xFePO_4$) and lithium nickel cobalt manganese composite oxides. Here, $0<x\leq1$, and $0<y\leq1$.

In the case of using a room temperature molten salt as the nonaqueous electrolyte for battery, examples of preferred active materials include lithium iron phosphate, $Li_xVPO_4F$ ($0\leq x\leq1$), lithium manganese composite oxides, lithium nickel composite oxides and lithium nickel cobalt composite oxides. Because the reactivity of these compounds with a room temperature molten salt is low, it is possible to improve the cycle performance.

The specific surface area of the positive electrode active material is preferably at least 0.1 $m^2/g$ and not more than 10 $m^2/g$. The positive electrode active materials having a specific surface area of equal to or more than 0.1 $m^2/g$ can sufficiently secure the sites of absorbing and releasing lithium ions. The positive electrode active materials having a specific surface area of equal to or less than 10 $m^2/g$ are easy to handle in terms of industrial production, and can also ensure favorable charge-discharge cycle performance.

A binder binds an active material and a current collector. Examples of the binder include polytetrafluoroethylene (PTFE), polyvinylidene fluoride (PVdF) and fluorine-based rubbers.

The conductive agent is incorporated as necessary in order to enhance the current collecting performance, and also to suppress the contact resistance between the active material and the current collector. Examples of the conductive agent include carbonaceous materials such as acetylene black, carbon black and graphite.

In the positive electrode active material layer, it is preferable that the positive electrode active material and the binder are incorporated in amounts of 80% to 98% by mass, and 2% to 20% by mass, respectively.

A sufficient level of electrode strength can be achieved by adjusting the amount of binder to at least 2% by mass. In addition, by adjusting the amount to 20% by mass or less, it is possible to reduce the added amount of the insulator of the electrode and to reduce the internal resistance.

In those cases where a conductive agent is added, it is preferable that the active material, the binder and the conductive agent are incorporated in amounts of 77% to 95% by mass, 2% to 20% by mass, and 3% to 15% by mass, respectively. It is possible to achieve the above effects by adjusting the amount of conductive agent to 3% by mass or more. In addition, by adjusting the amount to 15% by mass or less, it is possible to reduce the degradation of nonaqueous electrolyte on the surface of the positive electrode conductive agent during the storage at high temperatures.

It is preferable that the positive electrode current collector 13a is an aluminum foil, or an aluminum alloy foil containing at least one element selected from Mg, Ti, Zn, Ni, Cr, Mn, Fe, Cu and Si. It is desirable to set the thickness of the aluminum foil or aluminum alloy foil to 5 μm to 20 μm, more preferably equal to or less than 15 μm. The purity of the aluminum foil is preferably 99% by mass or more. The content of transition metals such as iron, copper, nickel, and chromium contained in the aluminum foil or aluminum alloy foil is preferably set to 1% by mass or less.

The positive electrode terminal 15 is formed, for example, from a material that is electrically stable and is conductive when the potential for lithium ion metal is within the range of 3 to 5 V, and preferably 3.0 to 4.25 V. More specifically, it is formed from aluminum or an aluminum alloy containing an element such as Mg, Ti, Zn, Ni, Cr, Mn, Fe, Cu or Si. It is preferable that the positive electrode terminal 15 be formed from a material similar to that of the positive electrode current collector 13a, in order to reduce the contact resistance with the positive electrode current collector 13a.

The positive electrode 13 is prepared, for example, by suspending the active material, the binder and the conductive agent to be added, if necessary, in an appropriate solvent to prepare a slurry, applying this slurry onto the positive electrode current collector, drying the resultant to form a positive electrode active material layer, followed by pressing. Alternatively, the active material, the binder and the conductive agent to be added, if necessary, are made into a pellet, which may be used as the positive electrode active material layer. The positive electrode active material layer thus obtained is disposed on the current collector to construct the positive electrode 13.

<Nonaqueous Electrolyte>

As a nonaqueous electrolyte, a liquid nonaqueous electrolyte or a gel nonaqueous electrolyte can be used. A liquid nonaqueous electrolyte can be prepared by dissolving an electrolyte in an organic solvent. A gel nonaqueous electrolyte can be prepared by making a composite of a liquid electrolyte and a polymer material.

The concentration of electrolyte in a liquid nonaqueous electrolyte is preferably in a range from 0.5 to 2.5 mol/L.

Examples of the electrolyte include lithium salts such as lithium perchlorate ($LiClO_4$), lithium phosphate hexafluoride ($LiPF_6$), lithium borate tetrafluoride ($LiBF_4$), lithium arsenic hexafluoride ($LiAsF_6$), lithium trifluoromethanesulfonate ($LiCF_3SO_3$) and lithium bis-trifluoromethyl sulfonyl imide [$LiN(CF_3SO_2)_2$], and a mixture of these. An electrolyte that is difficult to oxidize even at high potential is preferred, and $LiPF_6$ is most preferred.

Examples of organic solvents include cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyl tetrahydrofuran (2MeTHF) and dioxolane (DOX); linear ethers such as dimethoxyethane (DME) and diethoxyethane (DEE); γ-butyrolactone (GBL), acetonitrile (AN), and sulfolane (SL). These organic solvents can be used alone or as a mixed solvent.

Examples of polymer materials include polyvinylidene fluoride (PVdF), polyacrylonitrile (PAN) and polyethylene oxide (PEO).

Alternatively, a room temperature molten salt which contains lithium ions (i.e., ionic melt), a solid polymer electrolyte, an inorganic solid electrolyte or the like may be used for the nonaqueous electrolyte.

A room temperature molten salt refers to a compound which may be present in the form of a liquid at room temperature (for example, 15 to 25° C.), among those organic salts constituted of a combination of organic cations and anions. The room temperature molten salts include room temperature molten salts that are present as a liquid on its own, room temperature molten salts that become a liquid by being mixed with an electrolyte, and room temperature molten salts that become a liquid by being dissolved in an organic solvent. In general, the melting point of the room temperature molten salts used in nonaqueous electrolyte battery is not more than 25° C. In addition, organic cations generally have a quaternary ammonium skeleton.

A solid polymer electrolyte is prepared by dissolving an electrolyte in a polymer material and solidifying the resultant.

An inorganic solid electrolyte is a solid material having a lithium ion conductivity.

<Separator>

As a separator, for example, a porous film formed from a material such as polyethylene, polypropylene, cellulose and polyvinylidene fluoride (PVdF), a non-woven fabric made of a synthetic resin, or the like can be used. In particular, a porous film formed from polyethylene or polypropylene melts in a constant temperature and can block the electric current.

Therefore, these porous films are preferable from the viewpoint of safety improvements.

<Container>

As a container 10, it is possible to use a bag-like container made of a laminate film or a metal container. The thickness of the laminate film is preferably 0.5 mm or less, and more preferably 0.2 mm or less. The thickness of the metal container is preferably 1 mm or less, more preferably 0.5 mm or less, and still more preferably 0.2 mm or less.

The shape of the container 10 may be a flat shape (slim type), rectangular, cylindrical, a coin shape, a button shape, or the like. Examples of the containers, depending on the battery size, include containers for small battery to be installed in portable electronic equipment or the like, and containers for large battery to be installed in two-wheel or four-wheel automobiles or the like.

A multi-layered film in which a metal layer is interposed between the resin layers is used as the laminate film. The metal layer is preferably an aluminum foil or an aluminum alloy foil for weight reduction. It is possible to use, for example, polymer materials such as polypropylene (PP), polyethylene (PE), nylon and polyethylene terephthalate (PET) for the resin layer. The laminate film can be molded into the shape of the container by sealing due to thermal fusion.

The metal container is made from aluminum, an aluminum alloy or the like. The aluminum alloy is preferably an alloy containing an element such as magnesium, zinc and silicon. In those cases where a transition metal such as iron, copper, nickel and chromium is incorporated in the alloy, it is preferable to set the content thereof to 1% by mass or less. As a result, it is possible to dramatically improve the long-term reliability under high temperature conditions and the heat dissipation properties.

According to the above embodiment, it is possible to provide a nonaqueous electrolyte battery with improved storage properties and cycle performance.

Fourth Embodiment

Next, a battery pack according to a fourth embodiment will be described with reference to the drawings. The battery pack has one or several nonaqueous electrolyte batteries (unit cells) according to the third embodiment described above. When several unit cells are included, each unit cell is arranged so as to be electrically connected in series or in parallel.

FIGS. 7 and 8 show an example of a battery pack 40 which includes a plurality of flat-type battery shown in FIG. 5. FIG. 7 is an exploded perspective view of the battery pack 40. FIG. 8 is a block diagram illustrating the electrical circuit of the battery pack shown in FIG. 7.

A plurality of unit cells 16 are stacked so that the negative electrode terminal 14 and the positive electrode terminal 15 that are extended to the outside are aligned in the same direction, and constitute an battery module 18 by being fastened with an adhesive tape 17. These unit cells 16 are electrically connected with each other in series, as shown in FIG. 8.

A printed circuit board 19 is arranged so as to face the side of the unit cells 16 where the negative electrode terminal 14 and the positive electrode terminal 15 are extended. As shown in FIG. 8, a thermistor 20, a protection circuit 21 and a terminal 22 for energizing external devices are mounted on the printed circuit board 19. It should be noted that an insulating plate (not shown) in order to avoid unnecessary connections with the wiring of the battery module 18 is mounted on the surface of the printed circuit board 19 facing the battery module 18.

A positive electrode side lead 23 is connected to the positive electrode terminal 15 positioned at the lowermost layer of the battery module 18, and the tip thereof is inserted into and electrically connected to a positive electrode side connector 24 of the printed circuit board 19. A negative electrode side lead 25 is connected to the negative electrode terminal 14 positioned at the uppermost layer of the battery module 18, and the tip thereof is inserted into and electrically connected to a negative electrode side connector 26 of the printed circuit board 19. These connectors 24 and 26 are connected to the protection circuit 21 through wirings 27 and 28 formed on the printed circuit board 19.

The thermistor 20 is used to detect the temperature of the unit cell 16. The detected signals are transmitted to the protection circuit 21. The protection circuit 21 can shut off a plus side wiring 29a and a minus side wiring 29b between the protection circuit 21 and the terminal 22 for energizing external devices, under a predetermined condition. The predetermined condition refers to, for example, the case where the temperature detected by the thermistor 20 becomes equal to or more than a predetermined temperature. Also, the predetermined condition refers to the case of detecting overcharge, overdischarge, overcurrent and the like of the unit cells 16. This overcharge or the like is detected with respect to individual unit cells 16 or to all of the unit cells 16. When the overcharge or the like of individual unit cells 16 is detected, either the voltage of the battery may be detected or the potential of the positive electrode or negative electrode may be detected. In the latter case, a lithium electrode to be used as a reference electrode is inserted into each unit cell 16. In the case of FIGS. 7 and 8, a wiring 30 for detecting the voltage is connected to each unit cell 16, and the detected signals are transmitted to the protection circuit 21 through these wirings 30.

A protective sheet 31 made of rubber or resin is disposed on each of the three sides of the battery module 18 excluding the side from which the positive electrode terminal 15 and the negative electrode terminal 14 are projected.

The battery module 18 is accommodated within an accommodating container 32 together with each protective sheet 31 and the printed circuit board 19. In other words, the protective sheet 31 is disposed on each of the both inner surfaces in the direction of the long side and one inner surface in the short side direction of the accommodating container 32, and the printed circuit board 19 is disposed on the inner surface on the opposite side in the short side direction. The battery module 18 is located in a space surrounded by the protective sheet 31 and the printed circuit board 19. A lid 33 is attached to the upper surface of the accommodating container 32.

It should be noted that a heat shrinkable tape may be used in place of the adhesive tape 17 for the fixation of the battery module 18. In this case, a protective sheet is disposed on both sides of the battery module, and after the heat shrinkable tape is wound around, the heat shrinkable tape is thermally shrunk to fasten the battery module.

Although a configuration in which the unit cells 16 are connected in series is shown in FIGS. 7 and 8, they may be connected in parallel in order to increase the capacity of the battery. Alternatively, series connections and parallel connections may be combined. It is also possible to further connect the assembled battery packs in series or in parallel.

In addition, the aspects of the battery pack may be changed as appropriate depending on the application. The battery pack according to the present embodiment is suitably used in applications where excellent cycle performance are required when a large electric current is taken out. More specifically, the battery pack is used as the power source for the digital camera, or used, for example, as a battery for vehicles such as two- to four-wheel hybrid electric vehicles, two- to four-wheel electric vehicles and power-assisted bicycles. In particular, the battery pack is suitably used as a vehicle battery.

According to the above embodiment, it is possible to provide a battery pack with improved storage properties and cycle performance.

Fifth Embodiment

In a fifth embodiment, there is provided an active material that includes an LTO particle and a basic polymer that coats at least a part of the surface of the particle.

With respect to the LTO particles in which at least a part of the surface is coated with the basic polymer, the solid acid sites on the surface are neutralized, thereby weakening the influence of the isolated OHs and hydrogen bonds. As a result, when removing the moisture by drying in the manufacturing process of producing the battery, the moisture removal is accelerated. Accordingly, it is possible to suppress the gas generation, decline of the electrode performance, an increase in the internal resistance, and deterioration of the nonaqueous electrolyte. Therefore, it is possible to contribute to the improvement of cycle performance of the battery. In addition, by inactivating the solid acid sites in the LTO particles, a irreversible capacity of the battery can be reduced. For this reason, it is possible to improve the charging and discharging efficiency.

The active material in the present embodiment can be prepared as described in the first method of the above-mentioned second embodiment. In other words, the active material can be produced by dispersing the LTO particles in a solution of the basic polymer to prepare dispersion liquid, and then separating the LTO particles that are coated with the basic polymer from the dispersion liquid.

According to the embodiment, it is possible to provide the active material for producing a nonaqueous electrolyte battery with improved storage properties and cycle performance.

EXAMPLES

The above embodiments will be described below in more detail on the basis of Examples. It should be noted that the identification of the crystalline phase of LTO and the estimation of the crystal structure were carried out by a powder X-ray diffraction method using Cu-K$\alpha$ rays. In addition, the specific surface area was measured by the BET method. Further, the composition of the product was analyzed by the ICP method so as to confirm that the desired product was obtained.

Example 1

(Preparation of Negative Electrode)

A negative electrode was prepared using an LTO by the procedure, as shown in FIG. 1. First, a polybenzimidazole (PBI) solution was diluted with N,N-dimethyl acetamide to obtain a solution having a concentration of 20% by mass. 10 g of the LTO was mixed with this solution, followed by stirring. A solid content was separated by filtering the obtained white dispersion liquid, and was dried for 2 hours at 140° C. In this manner, the LTO which was coated with PBI was yielded. The content of PBI was 0.03% by mass, relative to the LTO prior to coating.

10% by mass of acetylene black serving as a conductive agent, relative to the total mass of the LTO, was mixed with the obtained powder of the coated LTO, and the resulting mixture was dispersed in water. It should be noted that the total mass of the LTO herein refers to the total mass derived by excluding the mass of the attached PBI. Carboxymethyl cellulose (CMC) serving as a thickening agent was added to and mixed with this dispersion liquid at a ratio of 2.5% by mass, relative to the total mass of the LTO (excluding the mass of the PBI). Subsequently, 2.5% by mass of styrene-butadiene copolymer rubber (SBR) serving as a binder, relative to the total mass of the LTO (excluding the mass of the PBI) was mixed with this dispersion liquid to obtain a slurry. This slurry was applied on a current collector made of an aluminum foil using a blade. The resultant was dried under vacuum for 12 hours at 130° C. to obtain a negative electrode.

(Preparation of Positive Electrode)

A combined agent for positive electrode prepared by mixing 85 parts by mass of powder of layered rock salt-type lithium cobaltate ($LiCoO_2$) as a positive electrode active material, 5% by mass of graphite and 5 parts by mass of acetylene black as conductive agents, and 5 parts by mass of PVdF as a binder was added to NMP, and the resultant was applied onto a current collector made of an aluminum foil having a thickness of 15 μm thickness, and then dried. Then, the resultant was subjected to a pressing process to prepare a positive electrode.

(Preparation of Nonaqueous Electrolyte Secondary Battery)

The prepared positive electrode and negative electrode were laminated via a separator, and the resulting laminate was spirally wound so that the negative electrode is positioned in the outer peripheral side, thereby producing an electrode group.

As the separator, a porous film made of polyethylene and cellulose was used.

A nonaqueous electrolyte solution was prepared by dissolving 1.0 mol/l of lithium hexafluorophosphate in a mixed solvent prepared by mixing ethylene carbonate and diethyl carbonate at a ratio of 1:2 in terms of volume ratio.

The produced electrode group and the prepared nonaqueous electrolyte solution were accommodated in a container made of an aluminum laminate, thereby assembling a nonaqueous electrolyte secondary battery. It should be noted that the amounts of positive electrode and negative electrode applied were adjusted so that the overall capacity of the assembled secondary battery was 1,000 mAh.

Example 2

A nonaqueous electrolyte secondary battery was prepared in the same manner as in Example 1 with the exception that a polyvinylidene fluoride (PVDF) was used as a binder instead of the SBR at a ratio of 10% by mass, relative to the total mass of the LTO (excluding the mass of the PBI).

Example 3

A nonaqueous electrolyte secondary battery was prepared in the same manner as in Example 1 with the exception that PVDF was used as a binder at a ratio of 10% by mass relative to the total mass of the LTO (excluding the mass of the PBI), without using the CMC and SBR.

Example 4

A nonaqueous electrolyte secondary battery was prepared in the same manner as in Example 1 with the exception that CMC was not used.

Example 5

An electrode was prepared by the procedure as shown in FIG. 3 using the LTO, and a nonaqueous electrolyte secondary battery was prepared using this electrode.

First, 10% by mass of acetylene black, relative to the LTO in terms of mass ratio, was mixed as a conductive agent. In addition, a PBI solution was diluted with N,N-dimethyl acetamide to obtain a solution having a concentration of 20% by mass. This solution was added to the above mixture at a proportion of 30% by mass relative to the LTO, and the resultant was stirred.

CMC serving as a thickening agent was mixed with this mixture at a ratio of 2.5% by mass relative to the total mass of the LTO. In addition, SBR serving as a binder was mixed at a ratio of 2.5% by mass relative to the total mass of the LTO. Further, acetylene black serving as a conductive agent was mixed at a ratio of 10% by mass relative to the total mass of the LTO to obtain a slurry. An electrode and a nonaqueous electrolyte secondary battery were prepared in the same manner as in Example 1 using this slurry.

Comparative Example 1

Acetylene black serving as a conductive agent was mixed with the LTO at a ratio of 10% by mass relative to the total mass of the LTO. This mixture was dispersed in water to obtain a dispersion liquid. CMC serving as a thickening agent was added to and mixed with this dispersion liquid at a ratio of 2.5% by mass relative to the total mass of the LTO. Subsequently, SBR serving as a binder was mixed at a ratio of 2.5% by mass relative to the total mass of the LTO to obtain a slurry. An electrode that did not contain a basic polymer was prepared using this slurry. The method of producing the electrode was the same as that in Example 1. Using this electrode, a nonaqueous electrolyte secondary battery was prepared in the same manner as in Example 1.

Comparative Example 2

A nonaqueous electrolyte secondary battery was prepared in the same manner as in Comparative Example 1 with the exception that CMC was not used.

Comparative Example 3

A nonaqueous electrolyte secondary battery was prepared in the same manner as in Comparative Example 1 with the exception that PVDF was used as a binder at a ratio of 10% by mass relative to the total mass of the LTO, without using the CMC and SBR.

<First Charge and Discharge Test>

A charge and discharge test was carried out using the battery of Examples 1 to 5 and Comparative Examples 1 to 3, and the first charge-discharge capacity was measured. Charging and discharging was carried out in the range of 1.5 V to 3 V at a current value of 1,000 mA. The measured capacity was calculated as capacitive density per unit mass of the LTO (mAh/g) excluding other components such as the current collector, the conductive agent, the additives, the basic polymer and the like. The results are shown in Table 1.

<Evaluation of Expansion>

An acceleration test for the gas generation was carried out under a high temperature environment of 65° C. using the battery of Examples 1 to 5 and Comparative Examples 1 to 3. After measuring the thickness of the battery after the first charging and discharging and adjusting the state to a predetermined charging condition, the battery were stored for 4 weeks in a thermostatic bath at 65° C. The thickness of the battery after storage was measured and calculated as a percentage relative to the battery thickness before the storage test.

<Measurement of Capacity Retention Ratio after Storage Test>

The capacity retention ratio after the storage test was measured using the battery of Examples 1 to 5 and Comparative Examples 1 to 3. The battery after the storage test which was used for the above expansion evaluation was charged, and the capacity when discharging was carried out to 1.5 V at a current value of 1,000 mA was measured. The capacity retention ratio was calculated based on the discharge capacity during the first charge and discharge.

<Evaluation of Discharge Performance>

An acceleration test for the electrode degradation was carried out under a high temperature environment of 60° C. using the battery of Examples 1 to 5 and Comparative Examples 1 to 3. The discharge capacity retention ratio was examined by conducting 100 cycles of repetitive charge and discharge (where one cycle refers to a pair of charge/discharge). Charge and discharge were carried out in the conditions where the voltage between the positive and negative electrodes was within the potential range of 1.5 V to 3.0 V, and a discharge current value of 1,000 mA. The capacity retention ratio was calculated based on the first discharge capacity at 1,000 mA. In addition, the battery resistance after the first charge and discharge and the battery resistance after 100 cycles of charge and discharge were measured to calculate the ratio of increase in battery resistance after 100 cycles.

<Results>

In Examples 1 to 5, no significant difference was observed in the first discharge capacity, as compared to Comparative Examples 1 to 3. From this observation, it was confirmed that the charge-discharge reaction was not inhibited even when coated with a basic polymer and the capacity was not impaired.

The ratio of change in the battery thickness after 4 weeks of constant-temperature storage was small in Examples 1 to 5, as compared to Comparative Examples 1 to 3. Therefore, it has been shown that the generation of gas was more suppressed in the battery of Examples 1 to 5 than in the battery of Comparative Examples 1 to 3. In addition, compared to Comparative Examples 1 to 3, the capacity retention ratio after storage was higher in Examples 1 to 5. It is thought that this is because the state of close contact between the electrode and the separator was maintained due to the suppression of gas generation. Thus, it has been shown that by containing the LTO and the basic polymer within the active material layer, the gas generation due to the introduction of water into the battery was suppressed, and the capacity deterioration due to the battery expansion was suppressed.

In addition, compared to Comparative Examples 1 to 3, the discharge capacity retention ratio after 100 cycles was higher in Examples 1 to 5. From this observation, it has been shown that by containing the LTO and the basic polymer within the active material layer, the reaction between the electrode and the nonaqueous electrolyte is suppressed, and deterioration in the battery performance is suppressed.

In addition, compared to Comparative Examples 1 to 3, the resistance increase ratio after 100 cycles was lower in Examples 1 to 5. From this observation, it has been shown that by containing the LTO and the basic polymer within the active material layer, an increase in the electrode resistance is suppressed. Furthermore, the resistance increase ratio after 100 cycles was particularly low in Examples 1 and 5 where both the CMC and SBR were used, and thus it has been shown that the effect of further suppressing the increase in resistance can be achieved by using these additives.

While certain embodiments have been described, these embodiments have been presented by way of example only, and are not intended to limit the scope of the inventions. Indeed, the novel embodiments described herein may be

TABLE 1

| | Basic polymer | Additive | First discharge capacity (mAh/g) | Ratio of thickness change after storage test (%) | Capacity retention ratio after storage test (%) | Capacity retention ratio after 100 cycles (%) | Resistance increase ratio after 100 cycles (%) |
|---|---|---|---|---|---|---|---|
| Example 1 | PBI | CMC/SBR | 163 | 109.5 | 95 | 95 | 118 |
| Example 2 | PBI | CMC/PVDF | 162 | 113 | 93 | 94 | 121 |
| Example 3 | PBI | PVDF | 163 | 120 | 92 | 90 | 131 |
| Example 4 | PBI | SBR | 163 | 117 | 94 | 89 | 126 |
| Example 5 | PBI | CMC/SBR | 164 | 110 | 96 | 96 | 115 |
| Comparative Example 1 | None | CMC/SBR | 162 | 138 | 70 | 85 | 155 |
| Comparative Example 2 | None | SBR | 160 | 144 | 72 | 82 | 167 |
| Comparative Example 3 | None | PVDF | 163 | 140 | 73 | 79 | 160 |

REFERENCE SIGNS LIST

1: Nonaqueous electrolyte secondary battery; 5: LTO particle; 6: Basic polymer layer; 7: Mixed layer of binder and conductive agent; 8: Mixed layer of binder, conductive agent and basic polymer; 9: Electrode group; 10: Container; 11: Negative electrode; 12: Separator; 13: Positive electrode; 14: Negative electrode terminal; 15: Positive electrode terminal; 16: Unit cell; 19: Printed circuit board; 20: Thermistor; 21: Protection circuit; 32: Accommodating container; 40: Battery pack.

What is claimed is:

1. An electrode, comprising a current collector and an active material layer on the current collector,
wherein the active material layer comprises a particle of lithium titanate compound having a spinel structure, a layer of polybenzimidazole, and a mixed layer comprising a cellulose ether compound and a copolymer rubber,
the layer of polybenzimidazole coats a surface of the particle of lithium titanate compound, and
the mixed layer coats the layer of polybenzimidazole.

2. A nonaqueous electrolyte battery comprising:
the electrode according to claim 1 as a negative electrode;
a positive electrode; and
a nonaqueous electrolyte.

3. A battery pack, comprising the nonaqueous electrolyte battery according to claim 2 and a container accommodating the nonaqueous electrolyte battery.

4. A method of producing an electrode, comprising:
dispersing a particle of lithium titanate compound having a spinel structure in a solution comprising a polybenzimidazole to prepare a first dispersion liquid comprising the particle of lithium titanate compound and the polybenzimidazole;
separating the particle of lithium titanate compound attached with the polybenzimidazole from the first dispersion liquid and drying to obtain the particle of lithium titanate compound coated with a layer of the polybenzimidazole;
adding the particle of lithium titanate compound coated with the layer of polybenzimidazole to a dispersion solvent to prepare a second dispersion liquid comprising the particle of lithium titanate compound coated with the layer of polybenzimidazole;
adding a cellulose ether compound and a copolymer rubber to the second dispersion liquid to prepare a slurry comprising the particle of lithium titanate compound coated with the layer of polybenzimidazole, the cellulose ether compound and the copolymer rubber; and
applying the slurry on a surface of a current collector and drying to form an active material layer,
wherein the active material layer comprises the particle of lithium titanate compound, coated with the layer of polybenzimidazole, which is coated with a mixed layer of the cellulose ether compound and the copolymer rubber.

5. The electrode according to claim 1, wherein the active material layer comprises the cellulose ether compound in an amount from 0.5% by mass to 5% by mass, relative to a total mass of lithium titanate compound contained in the active material layer.

6. The electrode according to claim 1, wherein the active material layer comprises the copolymer rubber in an amount from 0.5% by mass to 10% by mass, relative to a total mass of lithium titanate compound contained in the active material layer.

7. The electrode according to claim 1, wherein a molecular weight of the polybenzimidazole is from 100 to 100,000.

8. The electrode according to claim 1, wherein a molecular weight of the polybenzimidazole is from 500 to 5,000.

9. The electrode according to claim 1, wherein a ratio of an amount of the layer of polybenzimidazole to an amount of the particle of lithium titanate compound is from 0.01% by mass to 0.03% by mass.

10. The electrode according to claim 9, wherein
the cellulose ether compound is carboxymethyl cellulose, and
the copolymer rubber is selected from the group consisting of styrene-butadiene copolymer rubber and polyvinylidene fluoride.

* * * * *